United States Patent [19]

Brandstetter et al.

[11] 4,446,277

[45] May 1, 1984

[54] THERMOPLASTIC MOLDING MATERIAL

[75] Inventors: Franz Brandstetter, Neustadt; Adolf Echte, Ludwigshafen; Franz Haaf, Bad Durkheim; Juergen Hambrecht, Heidelberg; Herbert Naarmann, Wattenheim, all of Fed. Rep. of Germany

[73] Assignee: BASF Aktiengesellschaft, Fed. Rep. of Germany

[21] Appl. No.: 497,150

[22] Filed: May 23, 1983

Related U.S. Application Data

[63] Continuation of Ser. No. 338,104, Jan. 8, 1982, abandoned.

[30] Foreign Application Priority Data

Jan. 24, 1981 [DE] Fed. Rep. of Germany ....... 3102251

[51] Int. Cl.$^3$ .............................................. C08L 61/04
[52] U.S. Cl. ...................................... 525/68; 525/261; 525/289; 525/302; 525/905
[58] Field of Search ................. 525/68, 905, 302, 289

[56] References Cited

U.S. PATENT DOCUMENTS

| | | | |
|---|---|---|---|
| 3,383,435 | 5/1968 | Cizik | 525/68 |
| 3,853,968 | 10/1974 | Bortnick et al. | 525/303 |
| 4,128,602 | 12/1978 | Kutchman et al. | 525/68 |
| 4,128,603 | 12/1978 | Kutchman et al. | 525/68 |
| 4,304,881 | 12/1981 | Aoki et al. | 525/68 |

FOREIGN PATENT DOCUMENTS

| | | |
|---|---|---|
| 1260135 | 1/1965 | Fed. Rep. of Germany . |
| 52-32800 | 3/1977 | Japan . |

*Primary Examiner*—J. Ziegler
*Attorney, Agent, or Firm*—Keil & Witherspoon

[57] ABSTRACT

A thermoplastic molding material based on a styrene polymer which has been made impact-resistant, and on a polyphenylene ether, wherein the impact-resistant styrene polymer comprises a soft component which has a mean particle diameter of greater than 0.3 $\mu$m and contains an acrylic ester polymer as the elastomeric component. The novel molding materials possess improved flow and give moldings having improved aging resistance.

2 Claims, No Drawings

THERMOPLASTIC MOLDING MATERIAL

This is a continuation of application Ser. No. 338,104, filed Jan. 8, 1982 and now abandoned.

The present invention relates to thermoplastic molding materials based on styrene polymers which have been made impact-resistant and on polyphenylene ethers.

Thermoplastic molding materials which are useful for the production of moldings and contain impact-resistant styrene polymers together with polyphenylene ethers are disclosed, for example, in U.S. Pat. Nos. 3,383,435, 4,128,602 and 4,128,603. The soft component in these is generally polybutadiene. In addition, thermoplastic molding materials which are useful for the production of moldings and contain polyphenylene ethers and styrene polymers which have been made impact-resistant using, as the soft component, a polymer based on acrylic acid esters are disclosed, for example, in Japanese Laid-Open Application 77/32,800. These molding materials can be used to produce moldings which, compared to impact-resistant styrene polymers not mixed with polyphenylene ethers, exhibit better heat distortion resistance, while compared to molding materials comprising polyphenylene ethers and impact-resistant styrene polymers containing a soft component with a plurality of double bonds they exhibit improved aging resistance. The properties of such molding materials are generally satisfactory except that they have been found to have unfavorable flow characteristics and that their aging resistance requires improvement.

It is an object of the present invention to provide thermoplastic molding materials, based on impact-resistant styrene polymers and polyphenylene ethers, which possess improved flow and give moldings having improved aging resistance.

We have found that this object is achieved, according to the invention, by a thermoplastic molding material wherein the particles of the soft component of the impact-resistant styrene polymer have a mean diameter of greater than 0.3 $\mu$m and contain an acrylic ester polymer as the elastomeric component.

For the purposes of the present invention, a molding material is a mixture which can be converted by thermoplastic processing methods, within a certain temperature range, to moldings or to rod, sheet or tube. The molding material may be in the form of granules or powder or be premolded by tableting.

The impact-resistant styrene polymers used in the molding materials can be prepared by any suitable method, provided it results in the soft component particle size mentioned above. Thermoplastic molding materials in which the particles of the soft component of the impact-resistant styrene polymer have a mean diameter of from 0.3 to 1 $\mu$m are particularly suitable.

The thermoplastic molding materials can contain impact-resistant styrene polymers and polyphenylene ethers in virtually any ratio; for example, they can contain from 5 to 90% by weight of styrene polymer and from 95 to 10% by weight of polyphenylene ether. Particularly suitable materials for the production of moldings contain from 20 to 80% by weight of impact-resistant styrene polymers and from 80 to 20% by weight of polyphenylene ethers.

The most widely used process for the preparation of an impact-resistant styrene polymer comprising a soft component containing only a few double bonds is emulsion polymerization. Of course, other processes can also be used, provided the above particle size results.

Suitable monovinyl-aromatic compounds are, in particular, styrene, as well as nuclear-alkylated styrenes and side-chain alkylated styrenes. Preferably, styrene alone is used.

The hard component can be prepared by conventional methods, for example by means, solution, suspension or aqueous emulsion polymerization of styrene.

The hard component preferably has an intrinsic viscosity of from 40 to 140, especially from 80 to 120 dl/g. The intrinsic viscosity is determined by the method of DIN 53,726, using a solution of 0.5 g of the material in 100 ml of toluene.

The elastomeric component used is a polyacrylate.

The soft component is prepared in two stages. First, an acrylate ester polymer is prepared, onto which, in a second step, styrene is grafted to obtain the graft copolymer.

The graft copolymer to be employed according to the invention is prepared in a conventional manner by methods known per se. The grating base used is an acrylic ester polymer having a glass transition temperature of below 0° C., preferably below −20° C., especially below −30° C. The glass transition temperature of the acrylic ester polymer can be determined by, for example, the DSC method (K. H. Illers, Makromol, Chemie 127 (1969), 1). Suitable acrylic esters for the preparation of the polymers are, in particular, the alkyl acrylates, where alkyl is of 2 to 8, preferably of 4 to 8, carbon atoms, especially n-butyl acrylate and ethylhexyl acrylate. In preparing the acrylic ester polymers used as the grafting base, the acrylic esters may be employed individually or as mixtures.

In order to obtain crosslinked acrylic ester polymers—which are particularly advantageous grafting bases for the preparation of the graft copolymers—the polymerization of the acrylic esters is preferably carried out in the presence of from 0.5 to 10% by weight, preferably from 1 to 5% by weight, based on total monomers employed in the preparation of the grafting base, of a copolymerizable polyfunctional, preferably bifunctional, monomer which effects crosslinking. Suitable bifunctional or polyfunctional crosslinking monomers are those which preferably contain two, but may also contain more than two, copolymerizable ethylenic double bonds which are not 1,3-conjugated. Examples of suitable crosslinking monomers are divinylbenzene, diallyl maleate, diallyl fumarate and diallyl phthalate. Tricyclodecenyl acrylate has proved a particularly advantageous crosslinking monomer (cf. German Pat. No. 1,260,135).

The elastomeric component to be employed according to the invention can be prepared, for example, by the method described in German Laid-Open Application DOS 1,911,882. For example, a seeding latex is first prepared by polymerizing the acrylic ester or esters and the polyfunctional crosslinking monomer, in the presence or absence of other comonomers, in aqueous emulsion in a conventional manner at from 20° to 100° C., preferably from 50° to 80° C. The conventional emulsifiers, for example alkali metal alkylsulfonates, alkylarylsulfonates, alkyl-sulfates or fatty alcohol-sulfonates, salts of higher fatty acids of 10 to 30 carbon atoms, or resin soaps, can be employed. The sodium alkylsulfonates and sodium salts of fatty acids of 10 to 18 carbon atoms are preferred. Advantageously, from 0.1 to 5% by weight, especially from 0.5 to 2% by weight, based on the monomers employed in preparing the grafting base, are used. In general, a water:monomer ratio of from 2:1 to 0.7:1 is employed. Polymerization initiators used in particular include the conventional persulfates, for example potassium persulfate, but redox systems can also be used. In general, the amount of initiator used is from 0.1 to 1% by weight, based on the monomers employed in preparing the grafting base. Other polymerization auxiliaries which can be employed include the conventional buffers, eg. sodium bicarbonate and sodium pyrophosphate, used to obtain a pH of, preferably, from 6 to 9, and from 0 to 3% by weight of a molecular weight regulator, eg. a mercaptan, terpene or dimeric α-methylstyrene. The precise polymerization conditions, in particular the type, feed rate and amount of emulsifier, are selected, within the above ranges, so that the resulting latex of the crosslinked acrylic ester polymer has a $d_{50}$ (mean particle diameter) of from about 0.05 to 0.15 μm, preferably from 0.06 to 0.12 μm. This seeding latex is taken and, by addition of further monomers and emulsifiers, polymerization is continued to give a latex having the particle size of greater than 0.3 μm required according to the invention. In carrying out this further polymerization, the conditions are selected in a conventional manner (cf., for example, J. Appl. Polymer Sci., 2 (1965), 2,929–2,938), so that only the existing polymer particles of the seeding latex continue to grow, but no fresh latex particles are formed.

The particle size in the stock polymer latex can be adjusted as desired, by varying the ratio of the amount of seeding latex to the amount of monomers.

This seeding latex method is however not the only one which can be used; other polymerization processes known for the preparation of coarse dispersions and described, for example, in Houben-Weyl, Volume XIV/1, Georg Thieme Verlag 1961, pages 342–348 and 508–515, may also be employed.

To prepare the graft copolymer, styrene is next polymerized, in a second step, in the presence of the acrylic ester polymer latex obtained above. Advantageously, this graft copolymerization of styrene onto the acrylic ester polymer grafting base is also carried out in aqueous emulsion under the conventional conditions mentioned above, in particular in the same system as the emulsion polymerization by which the grafting base was prepared, but, where necessary, with addition of further emulsifier and initiator. The styrene to be grafted onto the polymer can be added to the reaction mixture as a single shot, or in several stages, or gradually during the polymerization. The graft copolymerization of styrene in the presence of the crosslinked acrylic ester polymer is conducted in such a way as to give a degree of grafting of from 10 to 60% by weight, preferably from 30 to 40% by weight, in the resulting graft copolymer. Since the grafting yield in this graft copolymerization is not 100%, the amount of styrene to be employed is somewhat greater than that which corresponds to the desired degree of grafting. The control of the grafting yield of the graft copolymerization and accordingly of the degree of grafting of the finished graft copolymer is familiar to any skilled worker and can for example be effected by controlling the feed rate of the monomers or by adding a regulator (Chauvel and Daniel, ACS Polymer Preprints 15 (1974), 329 et seq.). The emulsion graft copolymerization in general produces about 5–15% by weight, based on graft copolymer, of free nongrafted styrene polymer.

Depending on the conditions chosen for the preparation of the graft copolymer, a sufficient proportion of hard component may be formed during the graft copolymerization itself. In general, however, it is necessary to mix the product of the graft copolymerization with additional, separately prepared hard component.

For the purposes of the present invention, the soft component means that part of the impact-resistant polymer which is insoluble in toluene at room temperature (25° C.), minus any pigments. Accordingly, the soft component corresponds to the gel content of the product.

The mean particle size and particle size distribution were determined from the integral means distribution, by the method of W. Scholtan and H. Lange, Kolloid-Z. und Z.-Polymere 250 (1972), 782–796, using an analytical ultracentrifuge. The ultracentrifuge measurement gives the integral mass distribution of the particle diameter of a sample. From this, it is possible to deduce what percentage by weight of the particles have a diameter equal to or less than a certain size. The mean particle diameter, also referred to as the $d_{50}$ of the integral mass distribution, is, for the purposes of the present invention, defined as the particle diameter.

The polyphenylene ethers are compounds based on ortho-disubstituted polyphenylene oxides, the ether oxygen of one unit being bonded to the benzene nucleus of the adjacent unit.

The average molecular length should correspond to not less than 50 units. The polyphenylene ethers may contain halogen, hydrocarbon radicals which do not contain any tertiary hydrogen in the α-position, halohydrocarbon radicals, phenyl radicals and hydrocarbonoxy radicals. Accordingly, suitable polymers include poly-(2,6-dichloro-1,4-phenylene)-ether, poly-(2,6-diphenyl-1,4-phenylene)-ether, poly-(2,6-dimethoxy-1,4-phenylene)-ether, poly-(2,6-dimethyl-1,4-phenylene)-ether and poly-(2,6-dibromo-1,4-phenylene)-ether. Preferably, poly-(2,6-dimethyl-1,4-phenylene)-ether is employed, more especially with an intrinsic viscosity of from 0.45 to 0.65 dl/g (measured in chloroform at 30° C.).

The polyphenylene ethers can, for example, be prepared from the phenols in the presence of complexing agents such as copper bromide and sec.-dibutylamine.

The mixtures of the impact-resistant styrene polymers and polyphenylene ethers can moreover contain other additives, such as pigments, dyes, fillers and flameproofing agents, other compatible polymers, antistatic agents, antioxidants and lubricants.

The novel thermoplastic molding materials are obtained by mixing the soft and hard components and the polyphenylene ether. Usually, this is effected on an apparatus which permits homogeneous mixing, eg. a kneader, extruder or roll mill. The novel molding materials have not only good flow, but also good aging resistance and high heat distortion resistance.

In the Examples and Comparative Experiments, parts are by weight.

EXAMPLES AND COMPARATIVE EXPERIMENTS

Examples (a) Preparation of the seeding latex

98 Parts of butyl acrylate and 2 parts of tricyclodecenyl acrylate are polymerized in 154 parts of water containing 2 parts of sodium dioctylsulfosuccinate (70% strength) as emulsifier and 0.5 part of potassium persulfate by stirring for 3 hours at 65° C. A 40% strength dispersion is obtained, the mean particle size of the latex being about 0.1 μm.

(b) Preparation of the stock polymer latex

A mixture of 49 parts of butyl acrylate, 1 part of tricyclodecenyl acrylate and 0.38 part of the emulsifier is added, in the course of 1 hour, to a charge of 2.5 parts of the seeding latex from (a), 400 parts of water and 0.5 part of potassium persulfate at 65° C. In the course of a further hour, a mixture of 49 parts of butyl acrylate, 1 part of tricyclodecencyl acrylate and 0.76 part of emulsifier is added. 1 part of potassium persulfate in 40 parts of water is then introduced, and finally a mixture of 196 parts of butyl acrylate, 4 parts of tricyclodecenyl acrylate and 1.52 parts of the emulsifier is added dropwise in the course of 2 hours. The polymer mixture is then post-polymerized for 2 hours at 65° C. An about 40% strength dispersion having a mean particle diameter of about 0.5 μm is obtained.

If, instead of a total of 300 parts of monomer, only 100 parts are added, the latex obtained has a mean particle diameter of about 0.3 μm.

(c) Preparation of the graft copolymer 665 parts of styrene are polymerized in the presence of 2,500 parts of a stock polymer latex of the above composition and of mean particle size 0.1 μm, 2 parts of potassium persulfate, 1.33 parts of lauroyl peroxide and 1,005 parts of water, by stirring at 60° C. A 40% strength dispersion is obtained, from which the solid product is precipitated by adding a 0.5% strength calcium chloride solution; the product is washed with water and dried.

The parts of graft copolymer, homopolystyrene of intrinsic viscosity 74 ml/g and poly-(2,6-dimethyl-1,4-phenylene)-ether shown in the Table, together with 0.8 part of tris-nonylphenyl phosphite and 1.5 parts of polyethylene, are melted, homogenized and mixed in a twin-screw extruder at 280° C., and the mixture is granulated. The poly-(2,6-dimethyl-1,4-phenylene)-ether employed has an intrinsic viscosity of 0.49 dl/g (measured in chloroform at 30° C.).

The Vicat softening point is determined according to DIN 53,460/B and the melt index according to DIN 53,735.

To assess the aging resistance, standard small bars are molded from the mixtures of an Arburg Allrounder 200 injection molding machine at 280° C. The bars are exposed in a Xeno 1200 apparatus from Heraeus at 35° C. and an atmospheric humidity of 60%. Thereafter, the impact strength of the specimens is determined according to DIN 53,453, at 23° C.

TABLE

| | Graft copolymer | | Homopolystyrene [% by weight] | Poly-(2,6-dimethyl-1,4-phenylene)-ether | Vicat softening point [°C.] | Melt index under 21.5 kg at 250° C. [g/10 min] | Impact strength [kJ/m³] after exposure | |
|---|---|---|---|---|---|---|---|---|
| | Parts by weight | Particle size [μm] | | | | | 0 hours | 168 hours |
| Examples (according to the invention) | | | | | | | | |
| 1 | 50 | 0.5 | 25 | 25 | 114 | 186 | d.n.b.[1] | 30.5 |
| 2 | 50 | 0.5 | 15 | 35 | 125 | 130 | d.n.b. | 62.2 |
| 3 | 50 | 0.5 | 5 | 45 | 137 | 70 | d.n.b. | 87.5 |
| 4 | 50 | 0.3 | 25 | 25 | 115 | 179 | d.n.b. | 75.6 |
| Comparative Experiments (not according to the invention) | | | | | | | | |
| A | 50 | 0.1 | 25 | 25 | 114 | 141 | d.n.b. | 2.7 |
| B | 50 | 0.1 | 15 | 35 | 124 | 87 | d.n.b. | 28.2 |
| C | 50 | 0.1 | 5 | 45 | 137 | 25 | d.n.b. | 56.3 |

[1] d.n.b. = did not break

Comparative Experiments

98 Parts of butyl acrylate and 2 parts of tricyclodecenyl acrylate are polymerized in 154 parts of water, containing 2 parts of sodium dioctylsulfosuccinate (70% strength) as emulsifier and 0.5 part of potassium persulfate, by stirring for 3 hours at 65° C. An about 40% strength dispersion is obtained, the mean particle size of the latex being about 0.1 μm.

665 parts of styrene are polymerized in the presence of 2,500 parts of a stock polymer latex of the above composition and of mean particle size 0.3 μm or 0.5 μm, 2 parts of potassium persulfate, 1.33 parts of lauroyl peroxide and 1,005 parts of water, by stirring at 60° C. A 40% strength dispersion is obtained, from which the solid product is precipitated by adding a 0.5% strength calcium chloride solution; the product is washed with water and dried.

We claim:

1. A thermoplastic molding material based on a mixture of an impact-resistant styrene polymer and a polyphenylene ether, wherein the impact-resistant styrene polymer contains, as its soft component, a graft copolymer consisting essentially of styrene grafted to a copolymer of an alkyl acrylate, where the alkyl is of 4 to 8 carbon atoms, and 0.5 to 10% by weight, based on total monomers, of a copolymerizable polyfunctional monomer containing at least two copolymerizable ethylenic double bonds which are not 1,3-conjugated, the soft component having a mean particle diameter of from 0.3 to 1.0 μm.

2. A thermoplastic molding material as defined in claim 1, wherein the graft copolymer is a graft copolymer of styrene to a copolymer of butyl acrylate and tricyclodecenyl acrylate.

* * * * *

UNITED STATES PATENT AND TRADEMARK OFFICE
CERTIFICATE OF CORRECTION

PATENT NO. : 4,446,277
DATED : May 1, 1984
INVENTOR(S) : Franz BRANDSTETTER et al.

It is certified that error appears in the above-identified patent and that said Letters Patent is hereby corrected as shown below:

UNDER THE TITLE "FOREIGN PATENT DOCUMENTS"

52-32800 3/1977 Japan should be

--77-32800 3/1977 Japan--.

Signed and Sealed this

Eleventh Day of September 1984

[SEAL]

Attest:

Attesting Officer

GERALD J. MOSSINGHOFF

Commissioner of Patents and Trademarks